United States Patent [19]
Kurimoto

[11] Patent Number: 5,946,539
[45] Date of Patent: Aug. 31, 1999

[54] IMAGE FORMING APPARATUS HAVING A REFERENCE POSITION PREVENTING BLOCKAGE OF AN OPTICAL PATH

[75] Inventor: Akira Kurimoto, Ebina, Japan

[73] Assignee: Fuji Xerox Co., Ltd., Tokyo, Japan

[21] Appl. No.: 08/992,100

[22] Filed: Dec. 17, 1997

[30] Foreign Application Priority Data

Dec. 24, 1996 [JP] Japan .................................... 8-344127

[51] Int. Cl.$^6$ .................................................. G03G 15/00
[52] U.S. Cl. ......................... 399/372; 271/3.01; 399/205
[58] Field of Search ............................. 399/16, 17, 365, 399/371, 372, 379, 193, 200, 205, 217; 271/3.14, 4.01, 3.01

[56] References Cited

U.S. PATENT DOCUMENTS

| | | | |
|---|---|---|---|
| 4,422,751 | 12/1983 | Komiya et al. ............................ | 399/17 |
| 4,579,444 | 4/1986 | Pickney et al. .......................... | 399/372 |
| 4,610,533 | 9/1986 | Takahata ............................... | 399/17 X |
| 4,816,867 | 3/1989 | Ito ......................................... | 399/205 |
| 5,061,962 | 10/1991 | Takahashi ............................... | 399/205 |
| 5,187,530 | 2/1993 | Watanabe ................................ | 399/372 |

FOREIGN PATENT DOCUMENTS 5-323471  12/1993  Japan .

Primary Examiner—Arthur T. Grimley
Assistant Examiner—Quana Grainger
Attorney, Agent, or Firm—Oliff & Berridge, PLC

[57] ABSTRACT

Lights passing in the range of an optical path L1 to an optical path L2 are blocked off by a lead register 201 and, therefore, the light from a light source is prevented from reaching the range of a position P1 to a position P2. Lights in the range of an optical path L2 to an optical path L3 are allowed to pass through the end portion 203a of a platen glass 203. As a result of this, when an edge erasing processing is not executed, if a manuscript A is present in the range of the position P1 to a position P3, then a shadow is recorded in a recording sheet. To avoid this, a reference position RP, which is used as a reference when reading the images of the manuscript A, is set at a position which is more distant from the end portion 203a than the position P3. This prevents the recorded images from being influenced by variations in the quantity of light caused by the lead register 201 and end portion 203a.

8 Claims, 7 Drawing Sheets

IMAGE FORMING APPARATUS HAVING A REFERENCE POSITION PREVENTING BLOCKAGE OF AN OPTICAL PATH

BACKGROUND OF THE INVENTION

The present invention relates to an image forming apparatus which is suited to read the images of a manuscript and record the read images onto a recording sheet with high quality.

In a conventional copying machine, including an automatic manuscript feed device, when an operator sets a plurality of manuscript sheets in a manuscript tray and uses an operational panel on the machine to input a copy instruction, the manuscript sheets will be automatically fed one by one onto a platen glass. When the sheets are on the platen glass, the images of the manuscripts are read after which the sheets are delivered one by one to a discharge tray. Also, in a conventional copying machine, including an automatic manuscript device which copies both sides of a manuscript sheet, a guide member referred to as a "lead register", is provided at right angles to the feeding direction of the manuscript. The lead register causes the manuscript sheet to butt the end portion of the platen glass to regulate the position of the sheet. In this case, when the manuscript is delivered from the manuscript tray onto the glass platen, initially, images formed on the first surface of the manuscript sheet are read first. Then, if the lead register is lowered below the surface of the platen glass by a drive mechanism, the manuscript sheet is delivered through the end portion of the platen glass to a reversed delivery passage, where the front and back sides of the manuscript are mutually reversed. Then, the manuscript sheet is fed onto the platen glass. When images formed on the second surface of the manuscript sheet are read. Finally the manuscript sheet is delivered to the discharge tray.

To read the images of the manuscript sheet on the platen glass, a light is radiated onto the manuscript sheet from below the platen glass so that reflected light may be read by an image pickup device to generate image signals. In this situation image processing is performed on the image signals and is referred to as edge erasing processing. During edge erasing processing, the edge portion of the manuscript sheet within a range of 2 to 3 mm from the end portion of the manuscript is not recorded onto a recording sheet.

Furthermore, in the conventional copying machine having a lead register, because the light is blocked off by the lead register, a black stripe or shadow is generated inside the edge erased portion. Also, the optical path length of the light passing through a gap between the platen glass and lead register or the end portion of the platen glass is different from the optical path length of the light passing through the lower surface of the platen glass. Consequently, the light from the light source cannot be uniformly radiated onto the end portion of the manuscript sheet abutting the lead register. As a result, a black stripe or shadow is generated inside the edge erased portion. Furthermore, if the amount of the edge erasure is increased, the range lacking the image will also increase, depending on the size of the lead register and the thickness of the platen glass.

Furthermore, when attempting to copy a manuscript sheet using increased magnification, the influences of the lead register and the end portion of the platen glass are correspondingly expanded thereby increasing the range in which the image quality deteriorates, and cannot be dealt with by the edge erasing processing.

SUMMARY OF THE INVENTION

The present invention aims at eliminating the drawbacks found in the above-mentioned conventional copying machine. Accordingly, it is a main object of the invention to provide an image forming apparatus which can do away with image quality deterioration such as a black stripe or shadow without increasing the image lacking range.

In attaining the above object, according to the invention of Aspect 1, there is provided an image forming apparatus which comprises image signal generating means for radiating a light to a manuscript set on the upper side of a plane-shaped transparent member to thereby read the images of the manuscript and generate image signals, a guide member disposed adjacent to the transparent member and serving as a butting reference for the manuscript, image output means for recording the image signals on a recording sheet, and input means for inputting an operation instruction, and also the image forming apparatus is characterized by manuscript feed means which, when the images of the manuscript set on the upper side of the transparent member are read by the image signal generating means, moves the manuscript to a reference position distant from the guide member in such a manner that the manuscript can be prevented from being situated in at least one of an optical path allowing the above-mentioned light to pass through the end portion of the transparent member and an optical path causing the above-mentioned light to be blocked off by the guide member.

Also, according to the invention of Aspect 2, the manuscript feed means feeds the manuscript to a reference position previously determined in such a manner that the manuscript can be prevented from being situated in at least one of an optical path allowing the light to pass through the end portion of the transparent member and an optical path causing the light to be blocked off by the guide member, and, after the manuscript images are read by the image signal generating means, feeds the manuscript to a discharge tray.

Further, according to the invention of Aspect 3, the image forming apparatus of Aspect 1 further includes position detecting means for detecting the position of the manuscript set on the upper side of the transparent member, and data means for generating data representing a distance from the position of the manuscript detected by the position detecting means to a reference position previously determined in such a manner that the reference position does not correspond to at least one of an optical path allowing the light to pass through the end portion of the transparent member and an optical path causing the light to be blocked off by the guide member, while the manuscript feed means can move the manuscript to a position distant from the guide member in accordance with the above-mentioned data.

According to the invention of Aspect 4, the above-mentioned image forming means generates the image signal when a recording instruction for the images is input by the input means, and the above-mentioned position detecting means extracts the outline of the manuscript and detects the position of the manuscript based on the thus extracted outline of the manuscript.

And, according to the invention of Aspect 5, the manuscript feed means is disposed in such a manner that it can cover the transparent member from the upper side thereof and can be freely opened and closed, and also the manuscript feed means includes opening/closing means for detecting the opening and closing of the manuscript feed means, and control means, when the opening/closing means detects that the manuscript feed means is closed, for controlling the manuscript feed means such that it starts to move the manuscript.

And, according to the invention of Aspect 6, the image forming apparatus of Aspect 1 further includes reference position setting means for setting the reference position in accordance with an operation instruction input by the input means.

Also, according to the invention of Aspect 7, the above-mentioned input means is capable of inputting the magnification of the images, and the reference position setting means sets the reference position in accordance with the thus input magnification.

Further, according to the invention of Aspect 8, the input means is capable of specifying a full image mode for recording the manuscript up to the end portion thereof into the recording sheet, and the reference position setting means sets the reference position in accordance with whether the full image mode is specified by the input means or not.

According to the invention of Aspect 9, the above-mentioned manuscript feed means is disposed in such a manner that it can cover the transparent member from the upper side thereof and can be freely opened and closed, and also the manuscript feed means includes opening/closing means for detecting the opening and closing of the manuscript feed means, and control means, when the present opening/closing means detects that the manuscript feed means is open, for controlling the manuscript feed means such that it does not move the manuscript to the reference position.

Also, according to the invention of Aspect 10, the above-mentioned image forming means performs an edge erasing processing on a given range of the manuscript extending from the end portion thereof to thereby generate an image signal and varies the edge erasing amount of the manuscript in accordance with the opening and closing conditions of the manuscript feed means detected by the opening/closing detecting means.

DETAILED DESCRIPTION OF THE PREFERRED EMBODIMENTS

1. Structure of First Embodiment
1-1: Mechanical Structure

At first, description will be given below roughly of the mechanical structure of a first embodiment of an image forming apparatus according to the invention with reference to FIG. 1.

Figure 1:
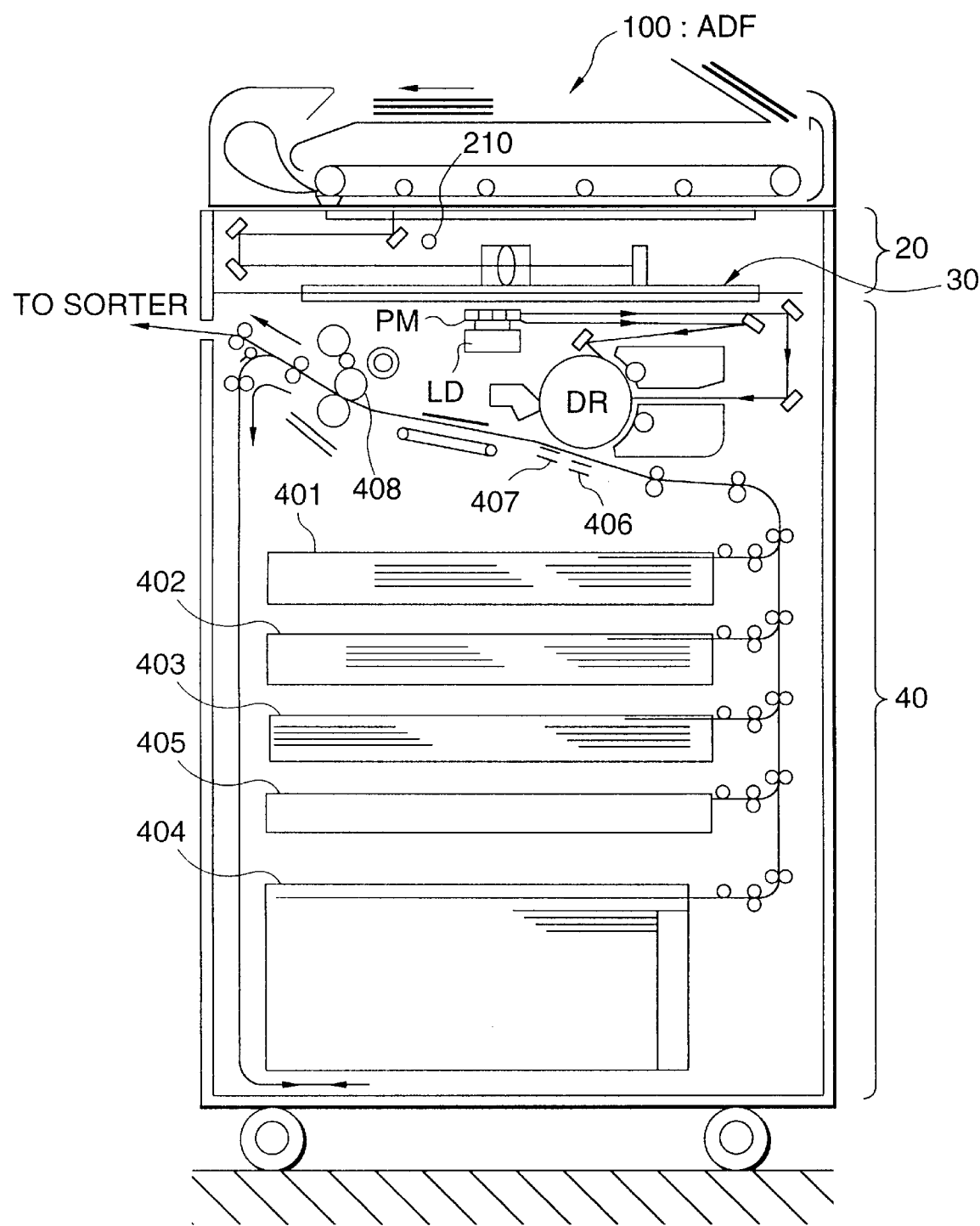
FIG. 1 is an explanatory view of the mechanical structure of an embodiment of an image forming apparatus according to the invention.

In FIG. 1, reference 100 designates an ADF (Auto Document Feeder) which feeds manuscript sheets one by one onto the platen glass surface of an image input part 20. This ADF 100 can be freely opened and closed with respect to the platen glass surface and also allows an operator to set the manuscript sheets manually. The image input part 20, which is composed of a light source 210, a CCD and the like, reads the images of the manuscripts fed by the ADF 100 or the images of the manuscripts set manually, and outputs the thus read image data to an image processing part 30.

The image processing part 30, as will be discussed later, performs an image processing such as an edge erasing processing or the like on the image data and then supplies the thus processed image data or image data GD to an image output part 40. The image output part 40, in accordance with the image data GD supplied from the image processing part 30, drives a laser diode LD and a polygon mirror PM to thereby form latent images on a photosensitive drum DR. Next, if a sheet is delivered from one of sheet cassettes 401 to 404 to the lower portion of the photosensitive drum DR, then a transfer coroton 406 transfers the latent images of the photosensitive drum DR to the present sheet. And, the sheet is peeled off from the photosensitive drum DR by a peel-off coroton 408. When the sheet is delivered to a fuser part 408, then the fuser part 408 fixes toner images formed on the present sheet. After fuser part 408 fixes the toner images, the sheet is delivered to a sorter (not shown). Here, in the case in which both faces of the manuscript sheet are to be copied, when the copy of the first face of the manuscript sheet is completed, then the manuscript sheet is delivered from the fuser part 408 to a both-face/synthesize tray 405, whereby the upper and lower faces of the manuscript sheet are reversed and then the manuscript sheet is delivered again to the lower portion of the photosensitive drum DR.

Figure 2:
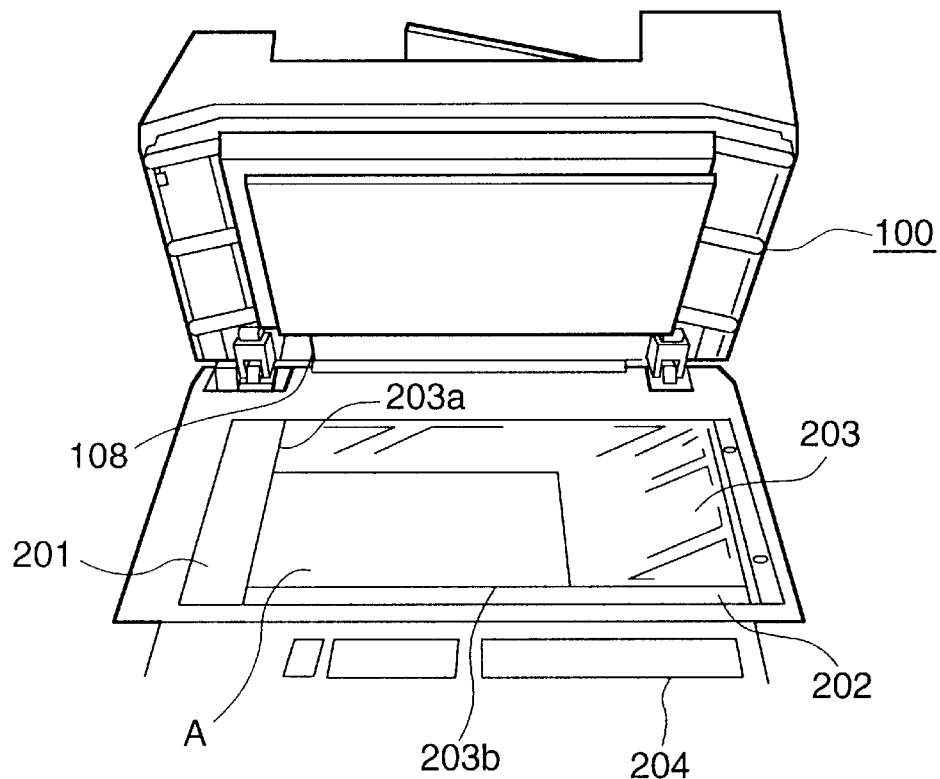
FIG. 2 is a perspective view of the image forming apparatus according to the above embodiment, showing a state thereof in which an ADF is open.

Next, FIG. 2 is a perspective view of the ADF 100, showing an state thereof in which it is open. In FIG. 2, a lead register 201 is provided in the end portion 203*a* of a platen glass 203, while a side register 202 is provided in the end portion 203*b* thereof. The lead register 201, when a user sets a manuscript A onto the platen glass 203 manually, functions as a guide member against which the manuscript A is butted lengthwise. On the other hand, the side register 202 serves as a guide member against which the manuscript A is butted lengthwise. By the way, as will be described later, the lead register 202 is structured such that it can be moved upwardly and downwardly.

Also, the ADF 100 further includes a pawl 108 and a limit switch (not shown) which is connected with the pawl 108, that is, these two components form an opening/closing sensor which will be described later. Further, on this side of the platen glass 203, there is disposed an operation panel 204 through which various instructions such as a copy start instruction, a copying magnification instruction, a mode selection instruction and the like can be input.

Figure 3:
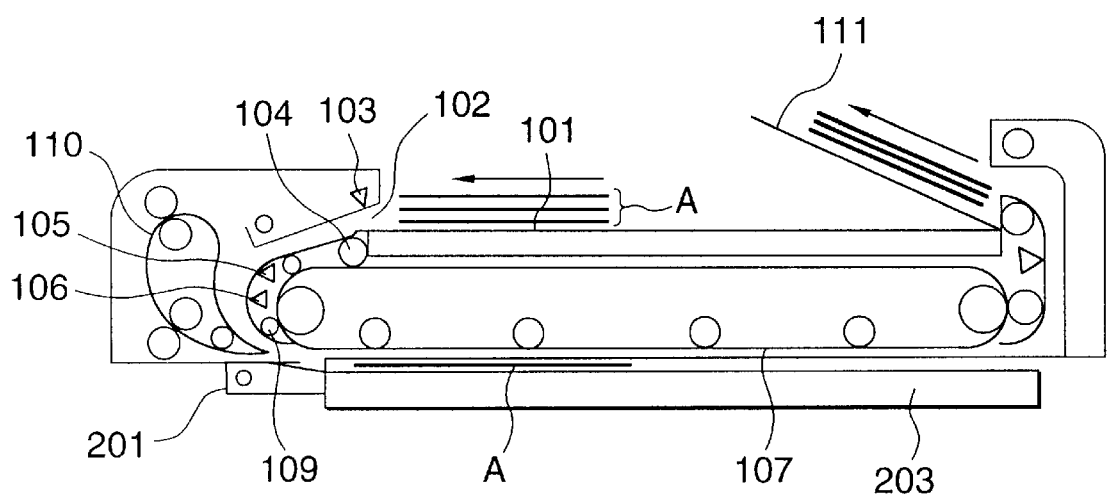
FIG. 3 is an explanatory view of the mechanical structure of an ADF employed in the above embodiment.

Next, description will be given below of the mechanical structure of the ADF 100 with reference to FIG. 3. A manuscript tray 101 is structured such that a plurality of manuscripts A can be set therein. Also, the manuscript A is butted against a manuscript insertion opening 102, then a butting sensor 103 detects that the manuscript A has been set. As a result of this, it is detected that a copying operation is to be executed in an automatic manuscript feed mode. And, if a user presses down a start button of the operation panel 204 (which is not shown in FIG. 3), then a butting roller 104 is rotated so that the manuscript sheets placed on the manuscript tray 101 are taken one by one into the interior portion of the ADF 100. In this operation, the size of the manuscript A is detected by a size sensor 105 and also the end portion of the manuscript A is detected by a register sensor 106. Then, the manuscript A is delivered onto the platen glass 203. A platen belt 107 is driven by a stepping motor which is connected to a register roller 109 through a mechanism system (not shown). For this reason, if a drive pulse to be supplied to the stepping motor is controlled, then the position of the manuscript A to be fed to the platen glass 203 can be adjusted.

Figure 4:
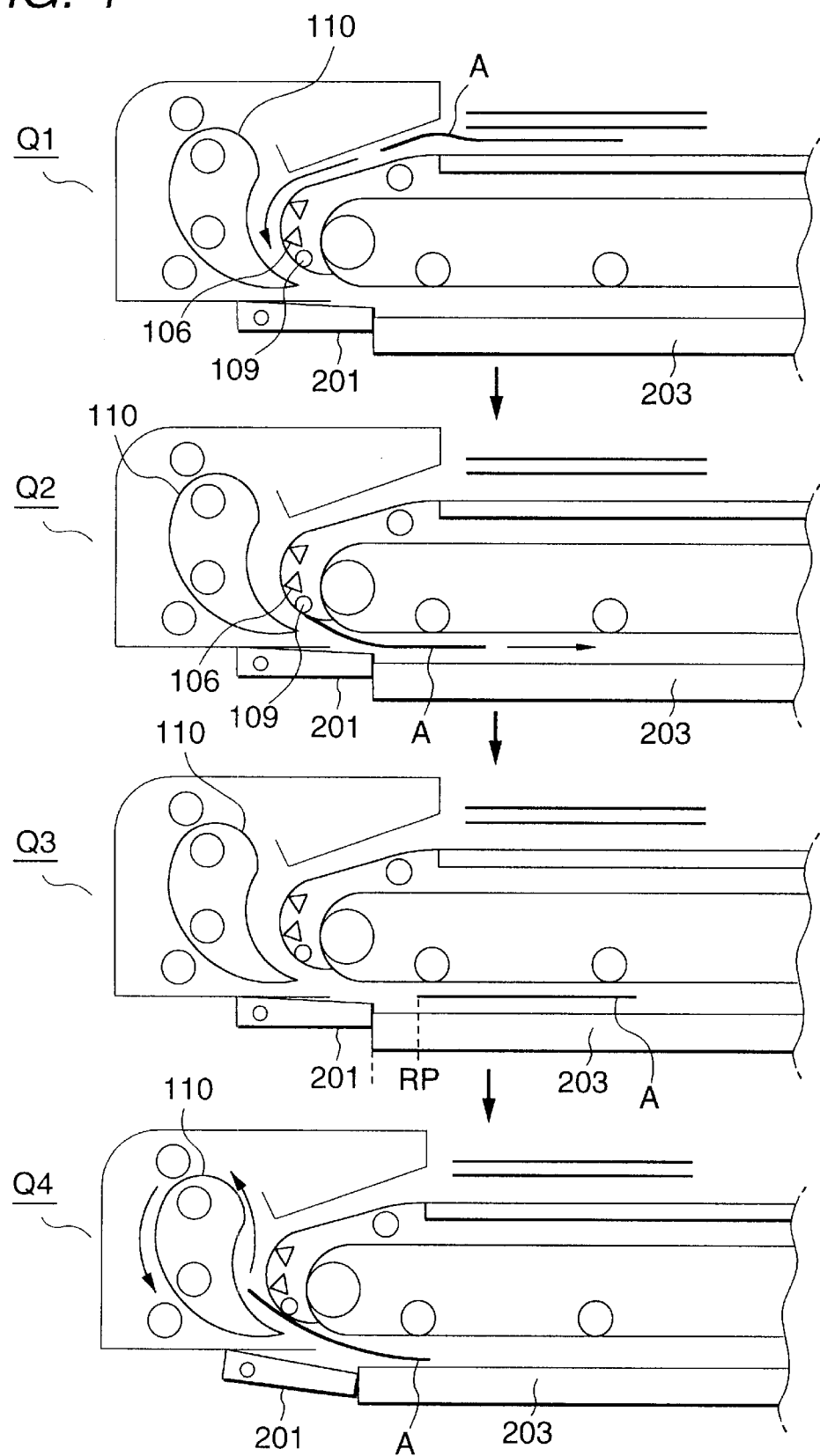
FIG. 4 is an explanatory view of an concept of the relationship between the feeding passage of a manuscript and a lead register in a both-face mode employed in the above embodiment.

Also, a manuscript reversing part 110 is provided in order to reverse the front and back faces of the manuscript A and is used in a both-face mode for copying both faces of the manuscript A. Here, description will be given of the relationship between the feed passage of the manuscript A and lead register 201 in the both-face mode with reference to FIG. 4. At first, in a condition Q1, the manuscript A is guided to a passage which is located on the right of the manuscript reversing part 110. In this case, the lead register 201 is projecting out from the upper surface of the platen glass 203. And, if the leading end portion of the manuscript A is detected by the register sensor 106, then the leading end portion of the manuscript A is guided by the register roller 109 onto the platen glass 203, thereby providing a condition Q2. In the condition Q2, although the lead register 201 is projecting out from the platen glass 203, since the manuscript A is fed from above, the lead register 201 does not stand in the way of the feeding operation of the manuscript A. After then, if the trailing end portion of the manuscript A reaches a given position, then the feeding operation of the manuscript A is stopped, thereby providing a condition Q3. In the condition Q3, not only the lead register 201 is projected out from the platen glass 203 but also the images of the manuscript A are read by a scanner part 200. After then, the condition Q3 shifts to a condition Q4. In the condition Q4, the lead register 201 is rotated downwardly again, while the manuscript A is moved through the right side of the manuscript reversing part 110 and is fed to the left side thereof, and is guided onto the platen glass 203 again. As a result of this, the front and back faces of the manuscript A can be reversed and thus the images on the back face of the manuscript A can be read. After then, the manuscript A is delivered by the platen belt 107 to a discharge tray 111. By the way, in the present embodiment, when reading the images of the manuscript, the position of the manuscript A on the lead register 203 side is referred to as a reference position RP.

Figure 5:
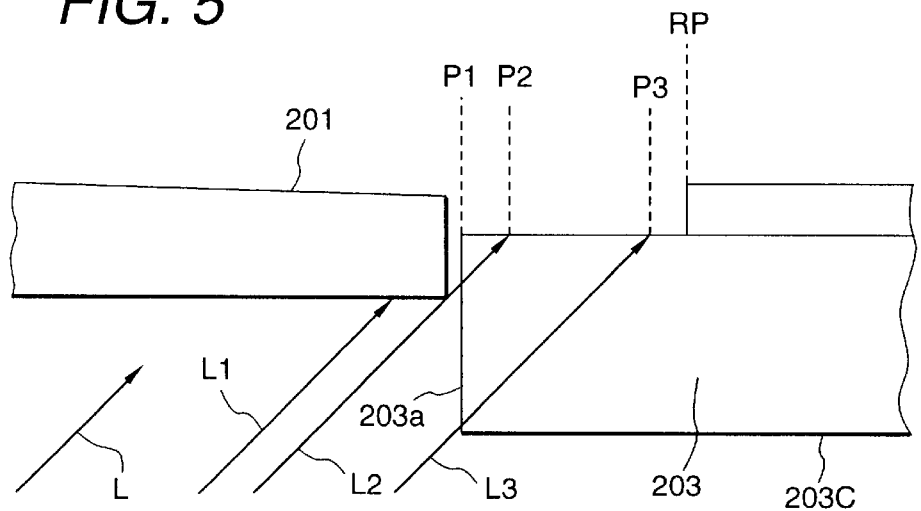
FIG. 5 is an enlarged section view of a portion in which a lead register and a platen glass according to the above embodiment are made to approach each other.

Next, description will be given below of the above-mentioned reference position RP with reference to FIG. 5. Here, FIG. 5 is an enlarged section view of a portion in which the lead register 201 and platen glass 203 are made to approach each other. In this embodiment, it is assumed that a light parallel to an arrow L in FIG. 5 is radiated from a light source (not shown). At first, since lights passing through a range from an optical path L1 to an optical path L2 is blocked off by the lead register 201, in the range of a position P1 to a position P2, the light from the light source is prevented from reaching the platen glass 203. Therefore, when no edge erasing processing is carried out, if the manuscript A is present in this range, then a black stripe is recorded on the recording sheet. Also, lights passing through a range from the optical path L2 to an optical path L3 are allowed to pass through the end portion 203a of the platen glass 203. In this case, the optical path length of the light that passes through the end portion 203a of the platen glass 203 is different from the optical path length of the light that passes through the lower surface 203c of the platen glass 203. Also, because it takes time and labor to polish the end portion 203a, the surface of the end portion 203a is not finished smoothly from the optical viewpoint. For this reason, in the end portion 203a, the light reflects diffusely and the quantity of light attenuates. Accordingly, in the range of the position P2 to the position P3, the light that has passed through the end portion 203a is different in the quantity of light from the light that has passed through the lower surface 203b. As a result of this, when no edge erasing processing is carried out, if the manuscript A is present in this range, then a shadow is recorded in the recording sheet.

In view of the above, according to the present embodiment, when no edge erasing processing is carried out, the reference position RP is set at a position which is more distant from the end portion 203a than the position P3. This avoids the influences of the variations in the quantity of light due to the lead register 201 and end portion 203a, thereby being able to prevent the image quality from being deteriorated due to the black stripe and shadow. By the way, the manuscript A is fed to the reference position RP, where the images of the manuscript A are read. Therefore, the more distant the reference position RP is from the end portion 203a, the longer a time necessary for feed of the manuscript A is, which lowers the productive efficiency of copies obtained. In view of this, it is desirable that the reference position RP is set adjacent to the position P3. In particular, according to the present embodiment, the reference position is set at a position which is distant in the range of 8 mm to 10 mm from the end portion 203a.

1-2: Electrical Structure of First Embodiment

Next, description will be given below of the electrical structure of the image forming apparatus according to the first embodiment of the invention with reference to FIG. 6.

Figure 6:
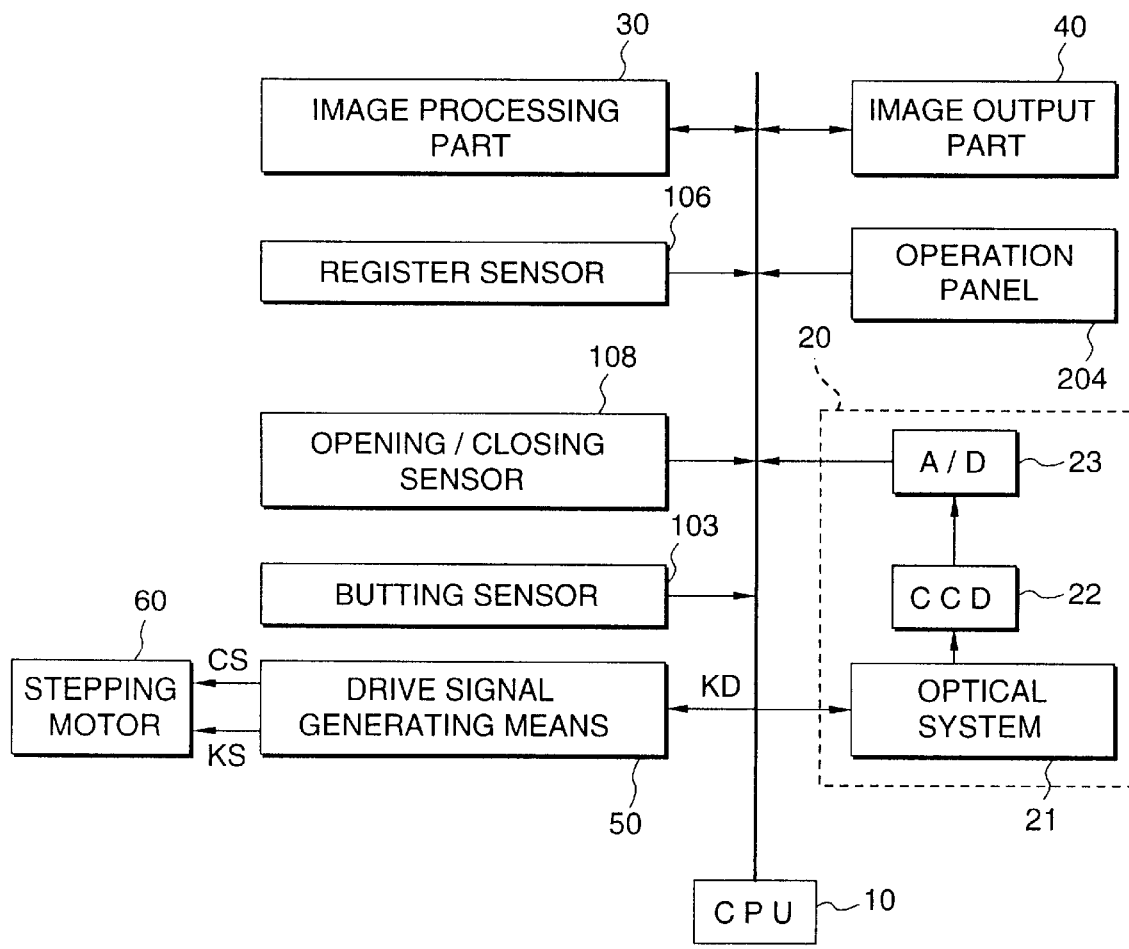
FIG. 6 is a block diagram of the mechanical structure of the image forming apparatus according to the above embodiment.

In FIG. 6, reference character 10 designates a CPU which is connected to the respective components of the image forming apparatus through a bus and controls the whole of the image forming apparatus. An image input part 20 reads the images of the manuscripts and converts them into electric signals. The image input part 20 consists mainly of an optical system 21, a CCD 22, and an A/D converter 23. And, the optical system 21 is composed of a halogen lamp, a mirror, a lens and the like. Also, the optical system 21 is structured as a so called reduced optical system. Further, the optical system 21 and CCD 22 are stored in a carrying member which is referred to as a carriage. The carriage is structured such that, when reading the images of the manuscripts, it can be moved along the lower portion of the platen glass 203 by a drive mechanism. And, the CCD 22 is a photoelectric converting element of an RGB line type and includes, for example, 5000 pixels per line. The images read by the CCD 22 are amplified by an analog amplifier (not shown), are thereafter converted into digital signals through the A/D converter 23, and are then output as image data GD.

Figure 11:
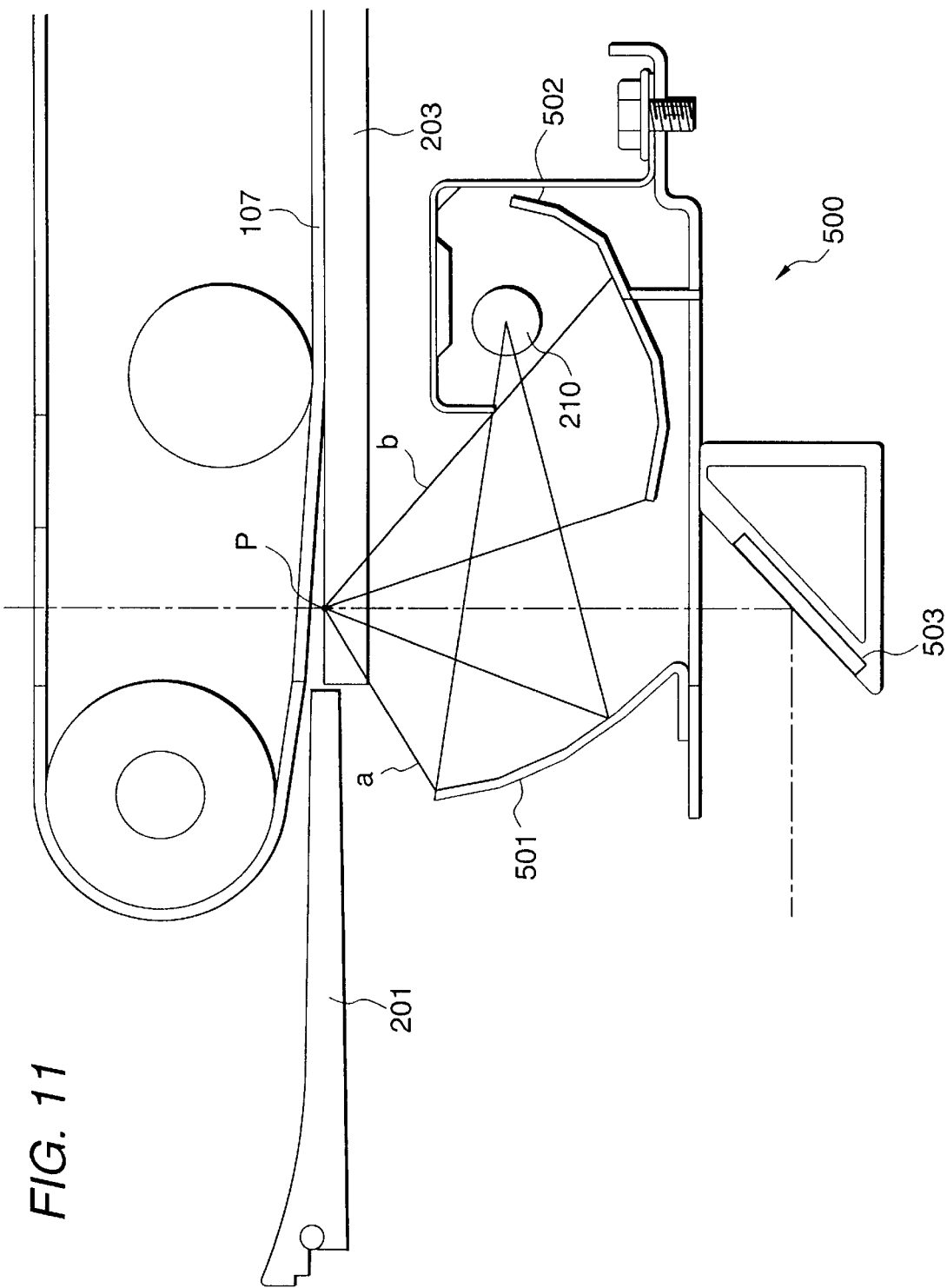

Here, description will be given below in more detail of the present reading optical system with reference to FIG. 11. In particular, the light emitted from a lamp 210 is reflected by a reflecting mirrors 501 and 502 toward the platen glass 203. The light reflected from the manuscript is guided to the CCD 22 (which is not shown in FIG. 11) by a mirror 503 and a group of mirrors (not shown). The lamp 210, reflecting mirrors 501, 502, and mirror 503 are respectively supported on the same frame and are structured such that they can be moved integrally along the platen glass 203 by a drive system (not shown).

In the present embodiment, the lamp 210 consists of a cylindrical halogen lamp, while the light that is radiated from the lamp 210 is a diffuse light. Also, the reflecting mirrors 501 and 502 are respectively formed in a concave shape so that the light can be condensed onto the reading target position of the manuscript; that is, the light rays passing between an optical path a and an optical path b are to be condensed onto the reading target position P.

Also, the image data GD, which are output from the image input part 20, are transferred to an image processing part 30 under the control of the CPU 10. In the image processing part 30, after a shading correction processing is performed on the image data GD, a color signal converting processing is performed. In the color signal converting processing, color correction parameters can be changed depending on whether the manuscript is a picture or a character. That is, in the case of the picture, a tinge of blue is emphasized and, on the other hand, for the character, a tinge of red is emphasized, thereby being able to reproduce an image which provides a natural feeling. By the way, the selection of the picture or character can be input by a user by means of an operation panel 204.

Next, an MTF processing is executed. In this processing, the resolving power of the image is adjusted to the characteristics of the image input part 20 and image output part 40. For example, when the manuscript is a picture, there can be generated moire depending on the relationship between an output screen and the number of lines of the manuscript. In the MTF processing, in order to solve such inconvenience, the high-pass frequency component of the image data is attenuated to thereby prevent the generation of moire.

Next, a gradation correction processing is executed. The optimum gradation correction characteristic varies according to the kind of the manuscript such as a picture, a character or the like. For this reason, the correction parameters are changed according to various modes before the gradation correction processing is executed.

After then, an edge erasing processing is carried out. In the edge erasing processing, the image data GD existing in a given range from the end portion of the manuscript are not to be output to the image output part 30. Due to this, nothing is printed in the range on which the edge erasing processing has been executed, so that the color of the recording sheet remains as it is in such range. By the way, when the manuscript is a picture, if the edge erasing processing is carried out, then a frame-like portion in which nothing is printed is produced in the end portion of the recording sheet, which provides a copy different from the image of the original manuscript. In view of this, a full image mode in which no edge erasing processing is executed can be input by means of the operation panel 204 and thus, if the full image mode is specified, then the edge erasing processing is omitted.

Also, the image output part 40 forms an image according to a xerography in which an electric signal is converted to an optical signal to thereby produce an electrostatic latent image. And, the image output part 40, as described above, is composed of a laser diode LD, a polygon mirror PM, a photosensitive drum DR and the like (see FIG. 1).

The operation panel 204 comprises a start button which is used to input a copy start instruction, select buttons respectively used to select the kind of a manuscript, specify the full image mode, instruct a both-face copying operation, and the like, a magnification specify button used to specify a copy magnification, and a display part for displaying instructions input and operation methods.

And, an opening/closing sensor 108 detects the open/closed states of the ADF 100, and then notifies the CPU 10 of the detect results. A butting sensor 103 detects whether the manuscript A is set in the manuscript tray 101 or not, and then notifies the CPU 10 of the detect results. The CPU 10 executes various control in accordance with these detect results.

Also, drive data KD is supplied to drive signal generating means 50 from the CPU 10. The drive data KD is composed of rotation direction data RD used to instruct the rotation direction of the shaft of a stepping motor 60, and distance data DD used to instruct a distance from the mounting position of the register sensor 106 to the reference position RP. By the way, the distance data DD is, expressed by the number of drive pulses to be supplied to the stepping motor 60. The drive signal generating means 50 generates a rotation direction control signal CS in accordance with the shaft rotation direction that is instructed by the drive data KD. If the rotation direction control signal CS is of a high level, then the shaft of the stepping motor 60 is rotated clockwise and, on the other hand, if it is of a low level, then the shaft of the stepping motor 60 is rotated counterclockwise. Also, the drive signal generating means 50 includes therein a down counter, a gate circuit and the like. And, if the drive data KD is supplied to the drive signal generating means 50, then the number of drive pulses that is instructed by the drive data KD is loaded into the down counter. After then, the down counter counts down a clock signal and, when the count value reaches [0], ends the down counting, and generates a ripple carry. The drive signal generating means 50, during a time period ranging from the start of the down counting to the generation of the ripple carry, outputs a clock signal through a gate circuit, and amplifies the clock signal to thereby generate a drive signal KS.

2. Operation of First Embodiment

Figure 7:
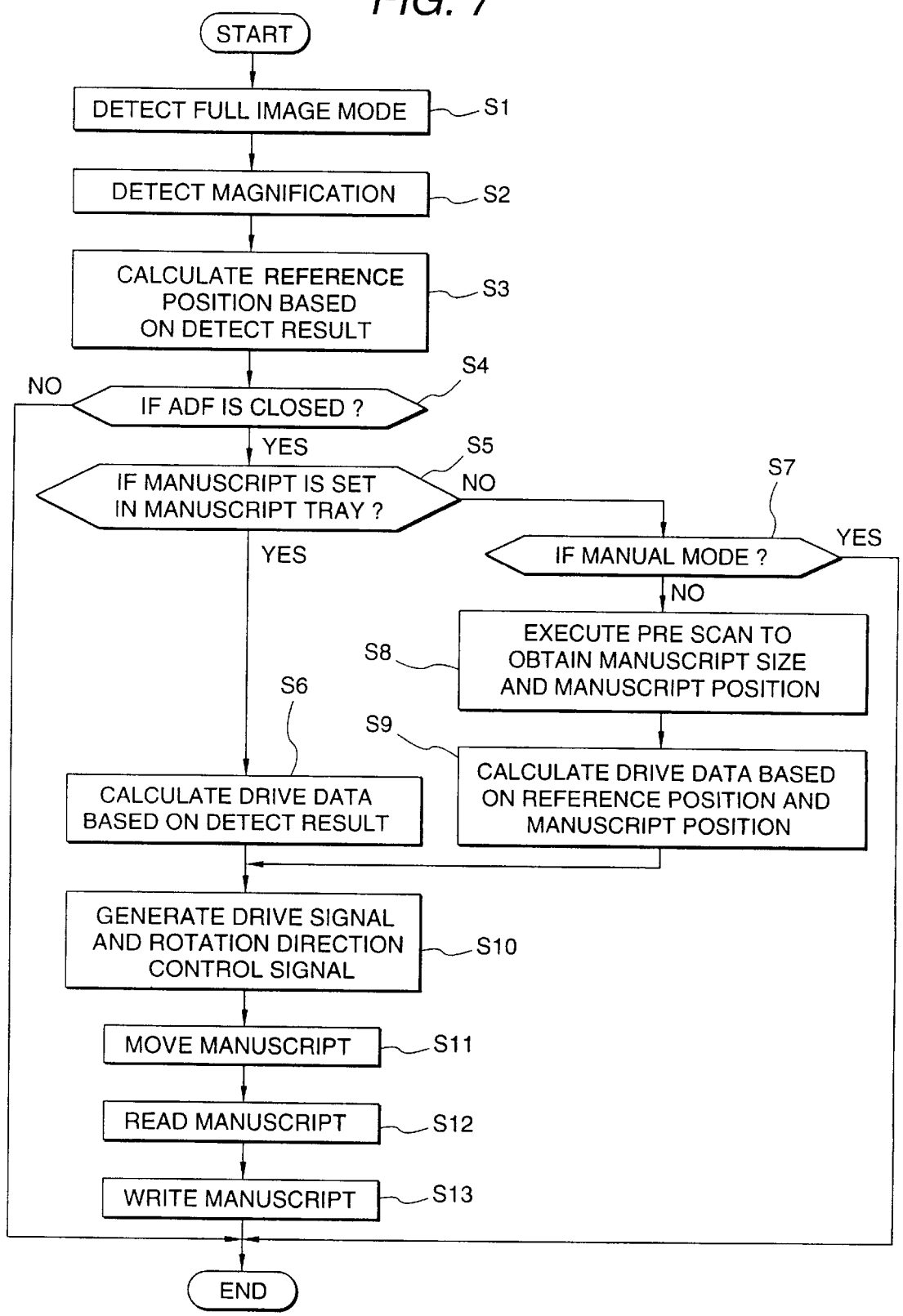
FIG. 7 is a flow chart of the operation of the image forming apparatus according to the above embodiment.

Next, description will be given below of the operation of an image forming apparatus according to the first embodiment of the invention with reference to the accompanying drawings. In particular, FIG. 7 is a flow chart which shows the procedure for the operation of the image forming apparatus according to the present embodiment. At first, the CPU 10 detects through the operation of the operation panel 204 whether the full image mode is specified or not (Step S1), and then detects the specification of the copy magnification (Step S1). After then, the CPU 10 calculates the reference position RP based on such information.

Figure 8:
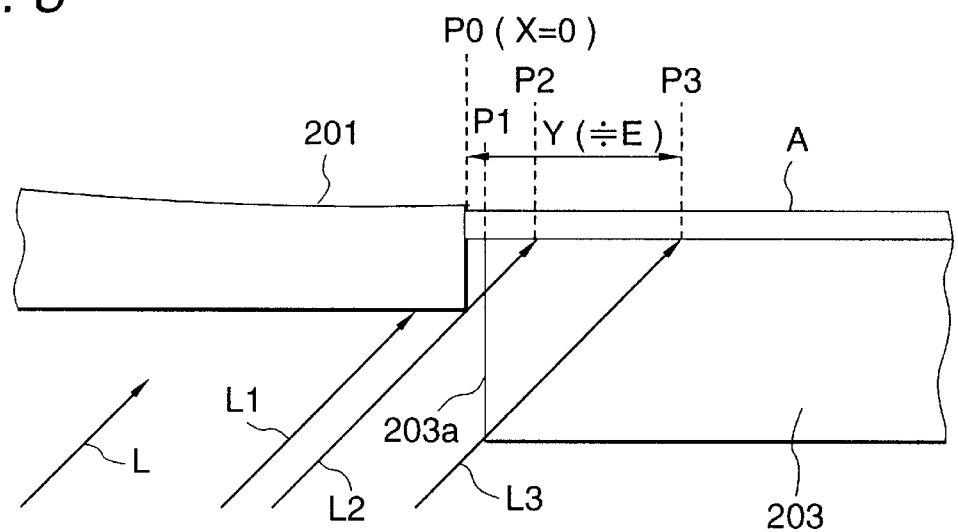
FIG. 8 is an explanatory view of how to set a reference position when a full image mode is not set according to the above embodiment.

Firstly, description will be given of how to set the reference position RP when the full image mode is not set. In this case, as described before, an edge erasing processing is executed in the image processing part 30. In this instance, at a magnification of 100%, there is set an erasing amount E in such a manner that, even if the manuscript A is manually so set as to be butted against the lead register 201, generation of the black stripe or shadow can be prevented. The setting of this erasing amount E is will be explained here using FIG. 8. That is, in this figure, a range from a position P0 to a position P3 is a range which, as described before, is influenced by the lead register 201 or the end portion 203a of the platen glass 203 so that the black stripe or shadow can be generated. In this case, by setting the erasing amount E larger than a distance Y from the position P0 to the position P3, the deterioration of the quality of the image formed can be prevented. However, the large erasing amount E incurs the lack of the image quality and, for this reason, the erasing amount E is set such that it is substantially equal to the distance Y. For example, the erasing amount E may be set 2 mm to 3 mm. Here, if the position P0 is assumed to be an origin and a distance from the origin to the reference position RP is expressed as X, then the CPU 10, in the case of a 100% magnification, sets the distance X=0. Also, when the magnification is less than 100%, similarly, the CPU 10 sets the distance X=0.

Figure 9:
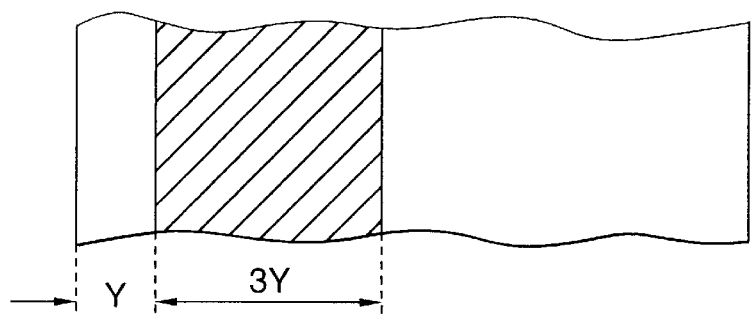
FIG. 9 is an explanatory view of a range in which a black stripe or shadow occurs when a magnification is 400% according to the above embodiment.
Figure 10:
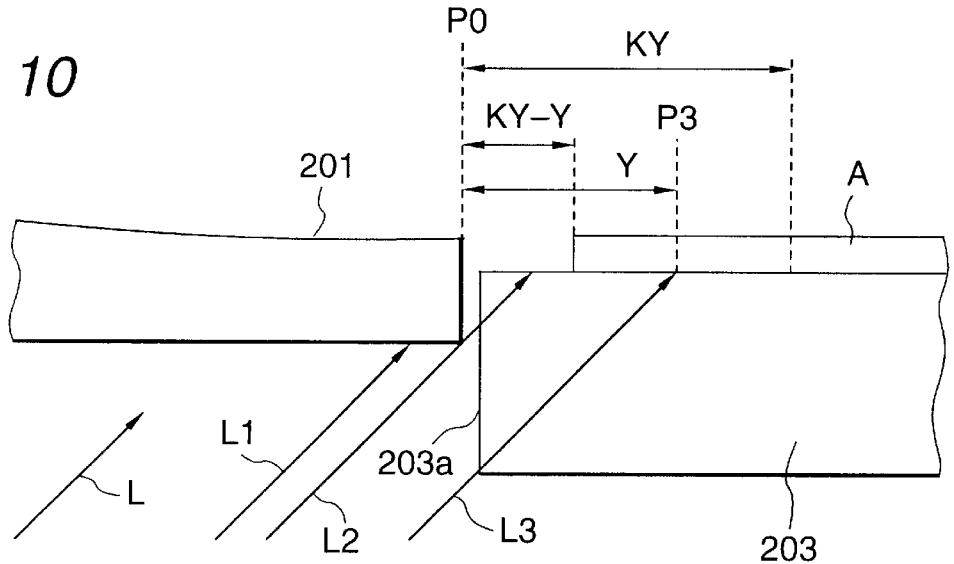
FIG. 10 is an explanatory view of the conditions that are used to select a reference position such that a black stripe or shadow is prevented against occurrence; and, FIG. 11 is an explanatory view of a reading optical system employed in the above embodiment.

Next, description will be given below of a case in which the magnification exceeds 100%. In this case, an erasing amount E is set equal to the erasing amount E in the case in which the magnification is 100%. This can prevent an increase in the lack of the image quality in a high magnification mode. Here, if the magnification is assumed to be 400%, then the range of generation of the black stripe or shadow is magnified four times to thereby provide 4Y. On the other hand, since the erasing amount E is Y, if the reference position RP is set such that X=0, then there occurs a black stripe or shadow in the oblique line portion of the recording paper that is shown in FIG. 9. In view of this, the reference position RP is selected in such a manner that such black stripe or shadow cannot be produced. This way of selection will be explained using FIG. 10. At first, if the magnification is K (K>1), then the range to be influenced by the lead register 201 or the end portion 203a is a range which extends from the position P0 to K·Y. If the manuscript is placed in this range, then a black stripe or shadow is generated but, on the other hand, an erasing amount Y is obtained by an erasing processing. Therefore, the reference position RP can be obtained by the following equation 1:

$$X = K \cdot Y - Y \qquad \text{Equation 1}$$

That is, the CPU 10, if the magnification is equal to or more than 100%, then calculates the reference position RP according to the equation 1 and, if the magnification is less than 100%, then sets that X=0.

Next, description will be given below of a case in which the full image mode is specified. In this case, since the erasing amount is 0, the reference position RP must be set such that the lead register 201 and the end portion 203a have no influence on the manuscript image at all. In this case, the reference position RP can be obtained by the following equation 2:

$$X = K \cdot Y \qquad \text{Equation 2}$$

After the reference position RP is calculated in this manner, the procedure advances to Step S4. In this processing, the CPU 10 judges in accordance with the detect result of the opening/closing sensor 108 whether the ADF 100 is closed or not. If the detect result shows that the ADF 100 is closed, then the judgment result is YES and thus the procedure advances to Step S5, in which the CPU 10 judges in accordance with the detect result of the butting sensor 103 whether the manuscript is set in the manuscript tray 101 or not. If the detect result shows that the manuscript is butted, then the judgment result is YES and thus the current mode is judged to be the automatic manuscript feed mode.

In this case, the procedure advances to Step S6, in which the CPU 10 generates the drive data KD based on the reference position PR. As described above, the drive data KD is composed of the rotation direction data RD and the distance data DD. Here, in the automatic manuscript feed mode, since the manuscript is fed from the manuscript tray 101 in a direction in which it is taken in, the CPU 10 sets the rotation direction data RD in such a manner that it corresponds to this manuscript feeding direction. By the way, in this example, the manuscript feeding direction (a direction in which the manuscript is taken in) is set as a + direction, whereas the opposite direction is set as a − direction. Also, the distance data DD, as described before, instructs a distance which ranges from the mounting position of the register sensor 106 to the reference position RP. Here, since the distance from the register sensor 106 to the position P0 is previously known, if this distance is set as X', then the CPU 10 calculates [X+X'] to thereby generate the distance data DD.

On the other hand, if the detect result of the butting sensor 103 does not instruct the butting of the manuscript, then the judgment result of Step S5 is NO and thus the procedure advances to Step S7, in which the CPU 10 judges in accordance with the input instruction of the operation panel 204 whether the current mode is a manual mode or not. Here, the manual mode is a mode in which the manuscript is set manually onto the platen glass 203 and is copied, while the position correction of the manuscript set is not made. For example, the manual mode is used when copying a manuscript with a character clipped out and a manuscript with the background drawn thereon in such a manner that they are superimposed on top of each other. If the user does not operate the operation panel 204, then the judgment result of Step S7 is NO. In this case, the current mode is a correction mode to correct the position of the manuscript and thus the procedure advances to Step S8, in which the CPU 10 controls the image input part 20 to execute a pre-scan processing.

Here, the pre-scan processing is a processing which is executed in order to specify the manuscript size and the manuscript position GP before reading the manuscript images. In particular, at first, while the light is being radiated from under the platen glass 203, the carriage is moved, the manuscript is read, and thus the image data GD are generated. After then, the image processing part 30 extracts the outline of the manuscript from the image data GD and, in accordance with the outline of the manuscript extracted, the CPU 10 calculates the manuscript position GP and manuscript size on the platen glass 203. By the way, the manuscript position GP is expressed by a distance Z which, with the end portion 203a of the platen glass 203 as an origin, extends from the origin to the end portion of the manuscript.

Next, the CPU 10 generates the drive data KD in accordance with the reference position RP and manuscript position GP (Step S9). In this operation, at first, the rotation direction data RD is decided in accordance with the dimensional relationship between X and Z. In particular, if Z <X, then the rotation direction data RD that instructs the + direction is generated. On the other hand, if Z>X, then the rotation direction data RD that instructs the − direction is generated. Here, if Z=X, then the reference position RP is coincident with the manuscript position GP and, therefore, the CPU 10 performs a processing in which the drive data KD is not generated. Also, the CPU 10 operates |Z−X| and outputs the operation result as the distance data DD.

If the drive data DD is calculated in this manner, then the drive signal generating means 50 generates the drive signal KS and rotation direction control signal CS based on the thus calculated drive data KD (Step S10), thereby driving the stepping motor 60. As a result of this, in the automatic manuscript feed mode, the manuscript in the manuscript tray 101 is delivered to the reference position RP and also, in the correction mode, the manuscript set manually is moved to the reference position RP (Step S11).

After then, if the CPU 10 detects that the movement of the manuscript is completed, then the CPU 10 notifies the image input part 20 of an instruction to execute a manuscript reading processing. On receiving the manuscript reading processing instruction, the image input part 20 reads the images of the manuscript and generates the image data GD (Step S12). After then, if the image processing part 30 performs an image processing such as a shading processing and the like on the image data GD to thereby obtain the image signal GS and then supplies the thus obtained image signal GS to the image output part 40, then the image output part 40 forms latent images on the photosensitive drum DR based on the image signal GS. The latent images are transferred to a recording sheet, whereby a copy is produced (Step S13).

By the way, when the ADF 100 is open, a book or the like is copied and thus the judgment result in Step S4 is NO. In this case, the procedure advances to Step S12, in which the above-mentioned reading processing is executed. Also, when the current mode is a manual mode, the procedure also advances to Step S12.

3. Modifications of First Embodiment

Although the first embodiment according to the invention has been described heretofore, the invention is not limited to the above-mentioned first embodiment but various modifications are possible which are as follows:

(1) In the above-mentioned first embodiment, in the full image mode, the reference position RP is set in such a manner that it exists out of the range of the position P0 to position P3 and, in the correction mode or manuscript automatic feed mode, there is executed a processing with the edge erasing processing taken into consideration. However, the invention is not limited to this but, in other modes than the full image mode, the reference position RP may be set without taking the erasing amount E into consideration.

(2) Also, in the above-mentioned first embodiment, in the lead register 201 and platen glass 203, since the lower end of the lead register 201 is situated higher than the lower surface of the platen glass 203, the end portion 203a has a prevailing influence on the shadow and the like. However, when the lower end of the lead register 201 is situated lower than the lower surface of the platen glass 203, the lead register 201 has a prevailing influence. Therefore, in order that the manuscript can be prevented from being situated in at least one of an optical path which allows the light to pass through the end portion 203a and an optical path which causes the light to be blocked off by the guide member, there may also be provided manuscript feed means which can move the manuscript to a reference position apart from the guide member.

By the way, when there is used a light source which emits a diffused light, most preferably, the reference position may be set in such a manner that all the optical paths connecting the reference position and the light source are not blocked off by either the guide member or the platen glass end face. For example, in the example shown in FIG. 11, most preferably, the reference position of the manuscript may be set in such a manner that, whenever the manuscript is scanned, all the ranges from the optical path a to the optical path b are not blocked off by either the guide member or the platen glass end face.

(3) Further, in the above-mentioned first embodiment, the manuscript A is placed on the platen glass 203 and the images of the manuscript A are read. However, the invention is not limited to this but, instead of the platen glass 203, there may also be used a plane-shaped transparent member which is formed of plastics or the like.

(4) Still further, in the above-mentioned first embodiment, description has been given of the image quality deterioration such as the shadow and the like caused by the lead register 201. This also applies to the side register 203 as well. In view of this, there may be provided adjusting means for adjusting the position of the manuscript in the longitudinal direction thereof and a similar processing may be executed by the adjusting means. In other words, the present invention can apply in any case, provided that the optical path can be blocked off by a guide member which provides a manuscript butting reference.

(5) Yet further, when an automatic manuscript feed device is used, normally, the manuscript is set at a position which is distant 1 mm or more from the side register 202. Such setting of the manuscript at a position distant from the side register is to prevent the possibility that, when feeding the manuscript, the manuscript can run up onto the side register and the manuscript is thereby impossible to be fed. However, such setting incurs generation of a shadow. To eliminate this, the position of the manuscript may be detected by a pre-scan processing, and the image data GD obtained from other portions than the manuscript may be removed by the image processing part 30, thereby being able to prevent the image deterioration such as the generation of a shadow and the like.

(6) In addition, in the above-mentioned embodiment, when it is detected by the opening/closing sensor that the ADF 100 is open, in most cases, a book or the like is copied and the book includes a relatively large margin. Therefore, in this case, the CPU 10 may set the erasing amount such that it can be increased.

As has been described heretofore, according to the subject matter of the invention, when the images of the manuscript placed on the upper side of a transparent member are read by the image signal generating means, in order that the manuscript is not situated in at least one of an optical path which allows the light to pass through the end portion of the transparent member and an optical path which causes the light to be blocked off by a guide member, the manuscript is moved to a reference position distant from the guide member. Thanks to this, even if the light is blocked off by the end portion of the transparent member or by the guide member, such blocked light does not have any influence on the read images, thereby being able to form the images of high quality.

What is claimed is:

1. An image forming apparatus comprising:

image signal generating means for radiating a light to a manuscript on an upper side of a plane-shaped transparent member to read images of the manuscript and generate image signals;

a guide member disposed adjacent to the plane-shaped transparent member and serving as a butting reference for the manuscript, a reference position of the plane-shaped transparent member is disposed a predetermined distance from the guide member;

image output means for recording the generated image signals on a recording sheet;

input means for inputting an operation instruction, the input means capable of specifying a full image mode for recording the manuscript up to an end portion of the manuscript onto the recording sheet;

reference position setting means for setting the reference position in accordance with the operation instruction input by the input means, the reference position setting means setting the reference position in accordance with whether the full image mode is specified by the input means; and manuscript feed means for moving the manuscript to the reference position when the images of the manuscript set on the upper surface of the plane-shaped transparent member are to be read by the image signal generating means, such that the manuscript is prevented from being set on the upper side of the plane-shaped transparent member in an optical path allowing the light radiated to the manuscript to pass through one of a first side end and a second side end of the plane-shaped transparent member and blocked by the guide member.

2. The image forming apparatus of claim 1, wherein said manuscript feed means feeds the manuscript to a reference position previously determined in such a manner that the manuscript is prevented from being situated in at least one of an optical path allowing the light to pass through the end portion of said transparent member and an optical path causing the light to be blocked off by said guide member, and, after the manuscript images are read by said image signal generating means, feeds the manuscript to a discharge tray.

3. The image forming apparatus of claim 1, further comprising:

position detecting means for detecting the position of the manuscript set on the upper side of said transparent member, and data means for generating data representing a distance from the position of the manuscript detected by said position detecting means to a reference position previously determined so that the reference position does not correspond to at least one of an optical path allowing the light to pass through the end portion of said transparent member and an optical path causing the light to be blocked off by said guide member, wherein said manuscript feed means move the manuscript to a position distant from said guide member in accordance with said data.

4. The image forming apparatus of claim 3, wherein said image forming means generates the image signal when a recording instruction for the images is input by said input means, and said position detecting means extracts the outline of the manuscript and detects the position of the manuscript based on the thus extracted outline of the manuscript.

5. The image forming apparatus of claim 3, wherein said manuscript feed means is disposed so as to cover said transparent member from the upper side thereof and is freely opened and closed, and comprises:

opening/closing means for detecting the opening and closing of said manuscript feed means, and control means, when said opening/closing means detects that said manuscript feed means is closed, for controlling said manuscript feed means so as to start to move the manuscript.

6. The image forming apparatus of claim 5, wherein said input means is capable of inputting the magnification of the images, and said reference position setting means sets the reference position in accordance with said magnification.

7. The image forming apparatus of claim 1, wherein said manuscript feed means is disposed so as to cover said transparent member from the upper side thereof and is freely opened and closed, and comprises:

opening/closing means for detecting the opening and closing of said manuscript feed means, and control means, when said opening/closing means detects that said manuscript feed means is open, for controlling said manuscript feed means so as not to move the manuscript to the reference position.

8. The image forming apparatus of claim 7, wherein said image forming means performs an edge erasing processing on a given range of the manuscript extending from the end portion thereof to thereby generate an image signal, and varies the edge erasing amount of the manuscript in accordance with the opening and closing conditions of said manuscript feed means detected by said opening/closing detecting means.

* * * * *